Oct. 12, 1954

J. I. MARCUM 2,691,775

LIMITER

Filed March 24, 1948

WITNESSES:

Leon M. Garman

INVENTOR

Jess I. Marcum.

BY

Hymen Diamond.

ATTORNEY

Patented Oct. 12, 1954 2,691,775

UNITED STATES PATENT OFFICE 2,691,775

LIMITER

Jess I. Marcum, Santa Monica, Calif., assignor to Westinghouse Electric Corporation, East Pittsburgh, Pa., a corporation of Pennsylvania Application March 24, 1948, Serial No. 16,850

11 Claims. (Cl. 343—5)

This invention relates generally to signal amplitude limiting devices, and more particularly to signal amplitude limiting devices having properties adapting them particularly for application in extremely high frequency circuits.

The use of rectifier elements as voltage limiters, to limit at relatively high signal levels, is well known, various types of rectifiers having been utilized for this purpose. Electronic tubes, usually diodes, have found extensive use in this connection, an appropriate circuit being described and illustrated in United States Patent No. 2,237,661, issued in the name of G. Ernst. Signal limiting has also been accomplished by rectifiers or non-linear circuit elements other than diodes, representative arrangements for effecting limiting being taught in United States Patents Nos. 2,248,793, issued in the name of V. J. Terry, which discloses use of dry rectifiers as limiters; 1,811,947, issued in the name of V. E. Legg, which discloses use of copper oxide-lead type rectifiers for use as limiters; and 2,059,194, issued in the name of D. T. Bell, which discloses utilization of thyrite as signal limiting means.

None of the signal limiting arrangements above referred to, nor any analogous arrangement known to applicant, is suitable for utilization at high signal frequencies, say of the order of 50–1,000 mc., by reason of the considerable inherent capacitance of the signal limiting elements. The figure of merit, or Q, of a resonant circuit coupled with the input circuit of an electronic control tube is limited by the grid to ground capacity of the tube, which may be of the order of 4 m. m. f. Coupling of a limiting device in parallel with this grid to ground capacity decreases the Q of the resonant circuit by increasing the effective capacity thereacross, thereby decreasing the gain of the tube, the effect becoming of increasing importance as the capacity introduced by the limiter approaches or surpasses the grid-ground capacity of the tube.

There is, accordingly, a need in the art for a signal limiter having extremely small inherent capacity, in comparison with the normal grid to ground capacity of vacuum tubes suitable for use at ultra high frequencies, a suitable value being of the order of less than 1 m. m. f.

I have discovered that a rectifier, or non-linear device, having the desired low shunt capacity (about .5 m. m. f.), as well as other valuable properties related to the limiting function, is provided by crystal rectifier units of the type heretofore extensively utilized as mixers, particularly in micro-wave radar equipment, and which have been commercially identified by the Joint Army-Navy designation IN21. Obviously, I am not limited to the particular crystal rectifier so identified, the identification being provided by way of example only.

The crystal rectifier above referred to appears as a high resistance, of the order of 20,000 to 100,000 ohms, at signal levels of 0 to .05 volt, while at signal levels of 1 volt and upward the forward resistance of the crystal drops to 50 ohms or less.

The limiter circuit above briefly described may be utilized in various combinations and arrangements, for various purposes. For example, where extremely severe limiting is desired two or more crystal units may be connected in parallel, and symmetrical limiting may be accomplished by connecting the crystal units back-to-back, or in bridge arrangements, as is well known in the prior art.

While I do not desire thereby to limit the applications of my invention, I have utilized the same as a protective device in a radar receiver, to reduce the intensity, at the receiver, of directly transmitted pulses, perhaps by a factor of 10 db, the crystal unit serving to by-pass the directly transmitted pulses, while presenting a high shunt resistance to reflected pulses of relatively low intensity. By reason of the low shunt capacity of the crystal unit, the gain of the limited stage or stages of the receiver is not materially affected, and by reason of the high shunt resistance introduced by the crystal unit, to signals of low intensity, the total by-pass effect of the unit on the stage or stages is quite negligible.

My novel limiter may find further application in the field of frequency modulation receivers. Such receivers normally include one or more limiting stages, in the I. F. channel. The design of such receivers may be materially simplified by locating the limiting function in the R. F. channel, since thereby the receiver channels succeeding the R. F. channel may be designed for operation at a constant, known, maximum signal amplitude.

It will be further realized that while I have referred to applications of my novel limiting arrangement for use in radio frequency stages of receivers, it is true that in superheterodyne receivers adapted for use at frequencies of the order of 10 cm. and above, intermediate frequency amplifiers may operate at frequencies of 40 mc. and above, a common value being 60 mc. My novel limiter finds application in the I. F. stages of such receivers.

For a more complete description of the invention, as applied in particular embodiments thereof, reference is made to the following specification, which may be taken in conjunction with the accompanying drawings, wherein.

Figure 5:
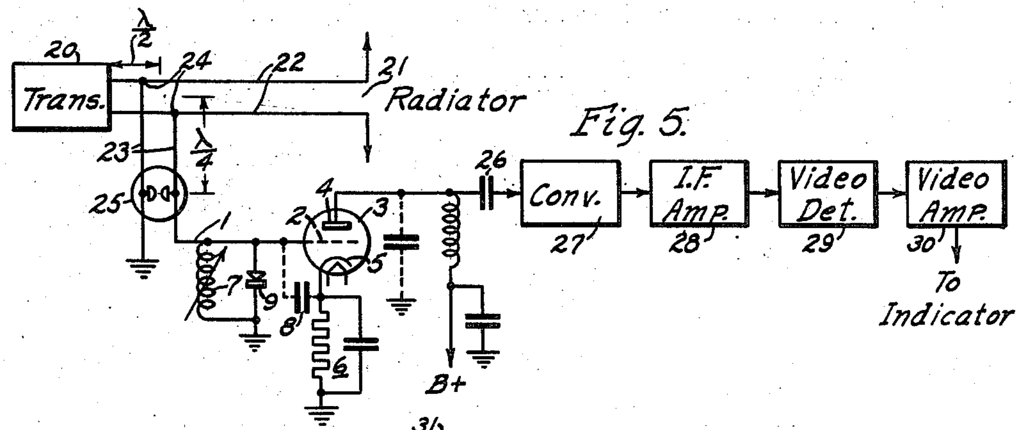
Figure 6:
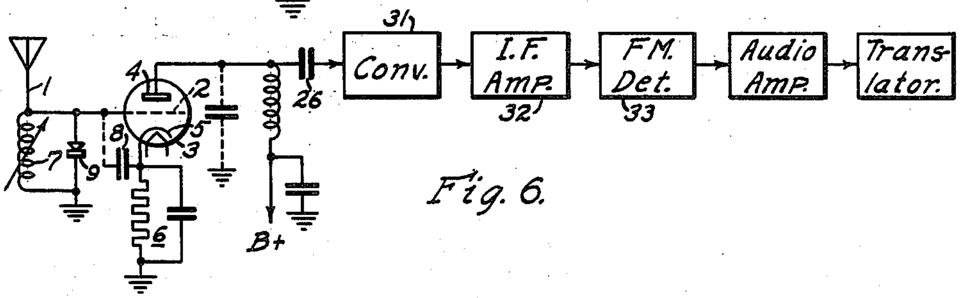

Fig. 5 is a conventionalized block circuit diagram of a radar transmitter-receiver system, illustrating the application of my novel limiting circuit to protection of the receiver against overload in response to directly transmitted pulses; and Fig. 6 is a circuit diagram of a frequency modulated signal receiver, illustrating the application of my novel limiter to the performance of an amplitude limiting function in the R. F. section of the receiver.

Figure 1:
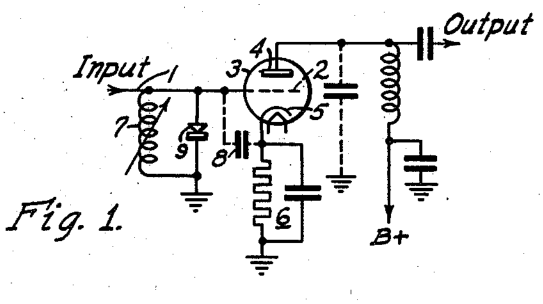
Figure 1 is a circuit diagram of an amplifier stage employing my novel signal limiting element.

Referring now more particularly to Figure 1 of the accompanying drawings, signal is impressed on a lead 1, which is connected with the control grid 2 of a triode 3, which comprises a plate 4 and a cathode 5. The input signal may be assumed to be in the ultra high frequency range, say from 50 mc. to 1,000 mc., although the circuit will function satisfactorily at lower frequencies. The cathode 5 is grounded over a conventional bias generating circuit 6, and signal is impressed, via lead 1, across a parallel tuned circuit comprising a tunable inductance 7 and the inherent grid-cathode capacity 8 of the triode 3.

The tube 3 is selected to possess an extremely low inherent grid-cathode capacity 8, to enable operation in the desired high frequency range, and in one practical case this capacity was found to be about 4 m. m. f. An increase of capacity in the tuned circuit results in a lower Q, at any particular frequency, so that the gain of the amplifier stage illustrated in Fig. 1 is an inverse function of the value of the capacity 8.

Connected across the inductance 7 is a crystal rectifier 9, the connection being such that the forward resistance is in the direction from grid to ground. At low signal levels (0 to 0.5 volt) the crystal 9 looks like a resistance of very high value (20,000 to 100,000 ohms), and a capacity of about .5 m. m. f., so that the crystal unit has substantially no effect in the circuit, but presents substantially the effect of an open circuit. At higher voltage input levels, say from 1 volt upward, the forward resistance of the crystal 9 drops to 50 ohms, or less, and consequently presents practically a short circuit across the input tuned circuit.

Figure 2:
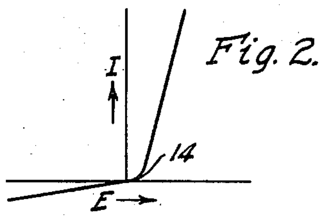
Fig. 2 illustrates a voltage-current characteristic of a typical crystal rectifier.

The resistance variations of the crystal 9 are illustrated in Fig. 2 of the drawings, which shows an E versus I characteristic of the crystal, the slope of which represents resistance. It will be clear from consideration of the characteristic curve of Fig. 2 that an extremely rapid change of crystal resistance takes place in the region of 14, which may correspond to about 0.5 volt.

Figure 3:
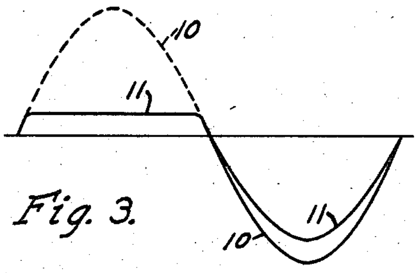
Fig. 3 is a wave form diagram illustrating the effect of limiting, at high input signal levels.

Upon impressing a sine wave voltage, for example, between lead 1 and ground, as illustrated at 10, Fig. 3, the voltage having a magnitude, say of one volt, the positive half of the sine wave 10 encounters a substantial short circuit, provided by the crystal 9, and the actual voltage impressed grid to cathode is that illustrated at 11. The negative half of the sine wave 10 is substantially unaffected.

Figure 4:
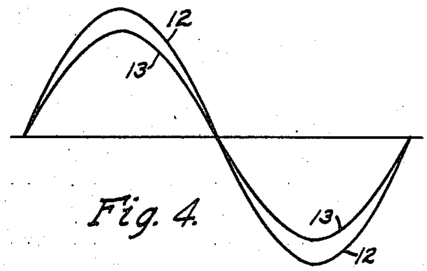
Fig. 4 is a wave form diagram illustrating the action of the limiter at low signal levels.

If the sine wave is, as at 12, Fig. 4, of slight magnitude, say .05 volt, or less, the crystal remains of high impedance, and the input wave is substantially undistorted and unmodified, as at 13.

Reference is now made to Fig. 5 of the drawings, wherein is represented a radar system, having a radio frequency amplifier, in accordance with the invention, in its receiving section.

The pulse transmitter 20 is coupled to a radiator 21, via a transmission line 22. A further transmission line 23 is coupled to the line 22 at a junction point 24, which is at a distance $\lambda/2$ from the transmitter 20. At a distance $\lambda/4$ from the junction point 24 is connected a T–R box 25, which operates in known manner to prevent direct transmission of signals from transmitter 20 to the receiver channel. Since the mode of operation of a T–R box, and its manner of connection in a radar system, are well known, and form no part of the present invention, further description thereof is dispensed with.

The line beyond the T–R box 25 is coupled with an R. F. amplifier which is in all respects identical with that illustrated in Fig. 1 of the drawings and described hereinbefore.

Upon transmission of a pulse by the transmitter 20, considerable energy leaks by the T–R box 25, and may, in the absence of special provisions and at high gain adjustments of conventional receivers, saturate the latter, temporarily. This undesirable contingency may be avoided by supplementing the T–R box with a crystal 9, in accordance with the teachings of my invention. At high signal levels, that is, in response to direct transmissions from the transmitter 20, the crystal 9 is driven at a voltage such that its resistance is low, and it acts effectively as a short circuit across the input of the receiver, preventing saturation. In this connection the crystal may be said to operate as a supplementary T–R box.

In some situations, especially where the receiver and transmitter of a radar system have independent antennas, no T–R box need be utilized, and the crystal 9 operates, in effect as a T–R box, denying the directly transmitted pulses access to the receiver.

The output of the R. F. amplifier is applied, over a suitable coupling condenser 26, to a converter 27, I. F. amplifier 28, video detector 29, video amplifier 30, and thence to a radar indicator system of any desired character, in a manner which is, per se, well known.

Turning to Fig. 6 of the drawings, there is illustrated a frequency modulated signal receiver, suitable for operation at 50 mc. and above, employing limiting by virtue of a crystal 9, and in accordance with the present invention. The output of the R. F. amplifier stage is effectively limited by the crystal 9, or if desired, by a pair of such crystals, in parallel.

The output of the amplifier is, accordingly, suitable for conversion to intermediate frequency, in a converter 31, the intermediate frequency signals being amplified in an amplifier 32, detected in a frequency modulation detector 33, and then amplified and translated into audible, or visible indications, or into control signals, as required. No additional limiting may be required in the I. F. amplifier stages, as is currently the practice. Utilization of inexpensive crystal elements, requiring no heating current, or bias or control voltages, thus enables elimination of the more usual or conventional diode limiting stages, or the like, with consequent economies in the manufacture of F. M. receivers.

While the discussion of the various embodiments of the invention hereinbefore described has proceeded upon the assumption that signal limiting is to take place in the R. F. channels of the various receivers, it will be clear that this is not an essential feature of the limiting arrangement, and that the latter may be utilized for limiting in I. F. channels as well, where the I. F. frequency is sufficiently high to render such utilization advantageous. It is not uncommon, for example, in microwave receiving systems employing frequencies of 10 cm. and above, to employ I. F. frequencies of 60 mc. In such event it will prove advantageous, should limiting prove desirable or necessary, to employ the crystal limiting arrangement of the present invention in the high frequency I. F. channel, the common limiting systems heretofore known and employed in the radio art being unsuitable for operation at these frequencies, as has been hereinbefore explained. In such event, the amplifier stage of Fig. 1 of the drawings may represent an I. F. amplifier stage rather than an R. F. amplifier stage.

While I have described and illustrated various embodiments and applications of the present invention, it will be clear that modifications of the circuit may be resorted to, without departing from the true scope of the invention. For example, the tube 3, illustrated as a triode, may be a tetrode, or a pentode, or, if desired, any other type of tube especially designed for operation at very high frequencies, such as klystrons and the like, where it is important that the input shunt reactance retain a low value.

I claim as my invention:

1. A signal amplitude limiting arrangement comprising an electronic tube, a tuned input circuit for said device having a predetermined capacitance, and a crystal rectifier connected in shunt with an element of said tuned circuit, said crystal rectifier having a capacitance appreciably smaller than said predetermined capacitance.

2. A signal amplitude limiting arrangement comprising an electronic tube having a grid and a cathode providing a predetermined capacitance, an inductance connected in shunt to said grid and cathode for providing in association with said capacitance a tuned input circuit for said electronic tube, and a crystal rectifier connected in shunt to said capacitance and having an inherent capacity appreciably smaller than said predetermined capacitance.

3. An amplifier comprising an electronic tube having a cathode, an anode, and at least one control grid, a tuned input circuit connected between said cathode and said at least one control grid, the electrical constants of said tuned input circuit being selected to provide resonance in the ultra high frequency spectrum, and a signal amplitude limiter connected in shunt to said tuned input circuit and comprising at least one crystal rectifier.

4. In a radar system, a pulse transmitter for generating micro-wave energy, a pulse receiver for receiving micro-wave energy scattered from a target, an antenna coupled with said transmitter and said receiver for radiating microwave energy generated by said transmitter and receiving micro-wave energy scattered from a target, a transmit-receive switch connected to said transmitter and said receiver for substantially preventing direct transmission of energy from said transmitter to said receiver, and a crystal rectifier connected in shunt relation with the input circuit of said receiver for by-passing energy of greater than a predetermined magnitude.

5. In a pulse radar receiver, an input circuit tuned to the frequency of received pulses, a crystal rectifier connected in shunt to said tuned input circuit for substantially by-passing received pulses having greater than a first predetermined magnitude and for presenting a high impedance to received pulses of less than a second predetermined magnitude.

6. In a pulse radar system, a pulse transmitter for emitting pulses in the ultra-high frequency spectrum, a pulse receiver for receiving energy scattered from remote objects and deriving from said pulses, said pulse receiver comprising an input circuit tuned to the frequency of said pulses, a transmit-receive device which imperfectly by-passes emitted pulses connected in shunt to said input circuit, and a crystal rectifier further connected in shunt to said input circuit, said crystal rectifier presenting a relatively low shunt resistance to unby-passed pulses and a relatively high shunt resistance to said scattered energy.

7. The combination in accordance with claim 6 wherein said tuned input circuit provides a predetermined figure of merit, and wherein the inherent shunt capacitance of said crystal rectifier possesses a value inadequate substantially to reduce said figure of merit.

8. In combination, an electronic tube having a tuned input circuit, said tuned input circuit comprising an inductance and a capacity, the magnitude of said capacity being substantially 5 micro-micro-farads, and a crystal rectifier signal limiter connected in shunt with said capacity, said crystal rectifier having an inherent shunt capacity of less than 1 micro-micro-farad.

9. A frequency modulated signal receiver comprising a radio frequency amplifier, said radio frequency amplifier having input terminals and comprising a signal amplitude limiting means consisting of a crystal rectifier shunting said terminals.

10. A signal receiver comprising a relatively high Q stage tuned to receive an ultra-high frequency signal and subjected to a wide range of signal amplitudes, a crystal rectifier connected in shunt with at least a portion of said tuned circuit for differentially by-passing received signals in accordance with the amplitudes thereof, said crystal rectifier possessing a sufficiently high inherent shunt reactance at the frequency of said signal to maintain substantially unmodified the Q of said stage.

11. In combination, an electronic tube having a grid and a cathode, a tuned input circuit for said tube, said tuned input circuit comprising an inductance and the inherent capacity between said grid and said cathode, the magnitude of said inherent capacity being substantially 5 micro-microfarads, and a crystal signal amplitude limiter connected in shunt with said inherent capacity, said crystal possessing a capacity less than 1 micro-microfarad.

(References on following page)

References Cited in the file of this patent

UNITED STATES PATENTS

| Number | Name | Date |
|---|---|---|
| 2,059,587 | Klotz | Nov. 3, 1936 |
| 2,173,925 | Tuxen | Sept. 26, 1939 |
| 2,172,732 | Crosby | Sept. 12, 1939 |
| 2,290,327 | Hansell | July 21, 1942 |
| 2,378,925 | Hoskins | June 26, 1945 |
| 2,445,409 | Shank | July 20, 1948 |
| 2,508,358 | Ayres | May 23, 1950 |
| 2,548,913 | Schreiner | Apr. 17, 1951 |
| 2,550,715 | Norton | May 1, 1951 |

| Number | Name | Date |
|---|---|---|
| 2,603,708 | Anger | July 15, 1952 |

FOREIGN PATENTS

| Number | Country | Date |
|---|---|---|
| 291,406 | Great Britain | June 13, 1928 |
| 190,281 | Switzerland | July 1, 1937 |
| 728,731 | Germany | Dec. 2, 1942 |
| 733,781 | Germany | Apr. 2, 1943 |

OTHER REFERENCES

QST Magazine, December 1946, page 4. (Copy in Div. 51.)